(No Model.)
J. B. CONNOLLY.
HORSE COLLAR.
No. 409,158. Patented Aug. 13, 1889.
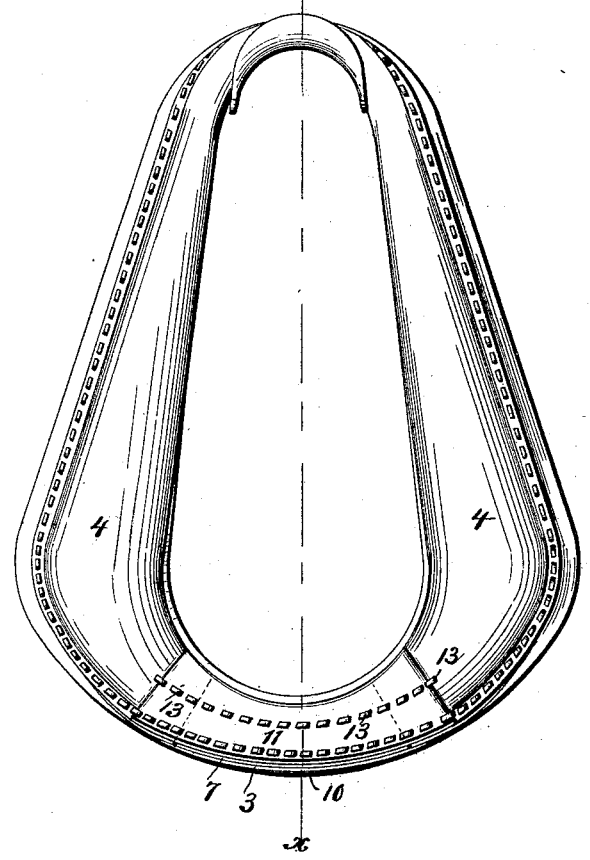
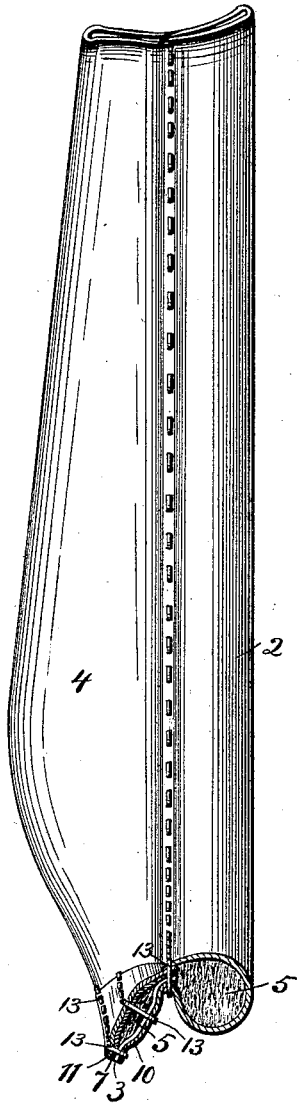
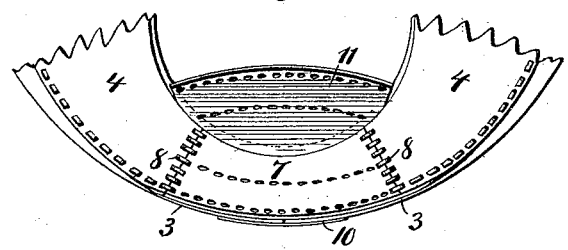
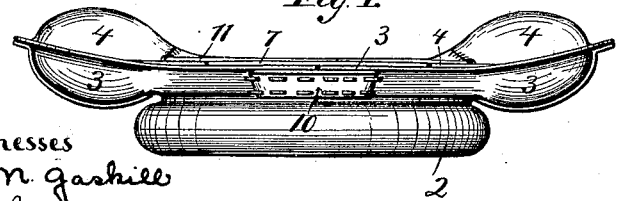
Witnesses
A. M. Gaskill
J. Jessen
Inventor.
John B. Connolly.
By Paul T. Merwin attys.

UNITED STATES PATENT OFFICE.

JOHN B. CONNOLLY, OF MINNEAPOLIS, MINNESOTA.

HORSE-COLLAR.

SPECIFICATION forming part of Letters Patent No. 409,158, dated August 13, 1889.

Application filed May 13, 1889. Serial No. 310,621. (No model.)

*To all whom it may concern:*

Be it known that I, JOHN B. CONNOLLY, of Minneapolis, in the county of Hennepin and State of Minnesota, have invented certain Improvements in Horse-Collars, of which the following is a specification.

The object of this invention is to provide a horse-collar with a throat-piece of such construction that it will not be pressed against the throat of the horse when in use.

The invention consists, generally, in a horse-collar having the straw filling extending across the throat of the collar, which is quilted so as to form a substantially rigid throat-piece that will retain its shape and will not be brought against the throat of the animal when in use.

In the accompanying drawings, forming part of this specification, Figure 1 is a face view of my improved collar. Fig. 2 is a vertical section of the same on line *x x* of Fig. 1. Fig. 3 is a detail view of a portion of the collar, showing the outside throat-piece turned back, so as to show the inside throat-piece beneath. Fig. 4 is a bottom view of the collar.

In the drawings, 2 represents the rim of the collar, 3 the shoulder-pieces, and 4 the liners. The rim and liners of the collar are provided with the usual straw filling 5, and this filling extends in a flat thin sheet from the liners through the throat of the collar, as shown in Fig. 2. An inside throat-piece 7 is arranged between the ends of the liners 4, being whipped to the liners by the stitches 8. By arranging the two throat-pieces in this manner without any joint at the center the collar is made much stronger at the center, the point where the greatest strength is required and where the ordinary collar is weakest.

The shoulder-pieces 3 extend preferably to the center of the collar, and a short piece 10 is arranged over the joint between the pieces 3. An outside throat-piece 11 is arranged upon the inner surface of the throat extending from one liner to the other across the inside throat-piece 7, as shown in Fig. 1, covering the joints of the inner throat-piece and liners. The entire throat portion of the collar is then quilted by the leather thongs 13, which are extended back and forth, passing through the leather and through the straw in the throat portion of the collar. By this means the throat portion of the collar is rendered stiff and strong, so that it retains its position against any considerable pressure that may be brought upon it, and is thus prevented from being pressed inward against the throat of the animal when in use. The throat portion is also by this quilting made thin, so that there is sufficient space for the hame-strap to catch under the rim of the collar, and thus prevent the hame from slipping off.

I claim as my invention—

A horse-collar comprising the rim 2 and shoulder-pieces 3, the liners 4, and a throat portion having a filling of straw extending across through the throat portion from one liner to the other, the inside throat-piece 7 arranged between and whipped to the liners 4, the outside throat-piece extending across from one liner to the other and covering the joints of the inside throat-piece, the central piece 10, covering the ends of the pieces 3, and a series of quilting-stitches passing through said throat portion, all substantially as described.

In testimony whereof I hereunto set my hand this 7th day of May, 1889.

JOHN B. CONNOLLY.

In presence of—
A. C. PAUL,
T. D. MERWIN.